United States Patent
Seo (10) Patent No.: US 7,676,189 B2
(45) Date of Patent: Mar. 9, 2010

(54) IMAGE READING APPARATUS HAVING IMPROVED COVER DEVICE

(75) Inventor: In-Sik Seo, Suwon-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 397 days.

(21) Appl. No.: 10/896,880

(22) Filed: Jul. 23, 2004

(65) Prior Publication Data

US 2005/0152008 A1 Jul. 14, 2005

(30) Foreign Application Priority Data

Jan. 12, 2004 (KR) .................. 10-2004-0002085

(51) Int. Cl.
*G03G 15/01* (2006.01)

(52) U.S. Cl. ............... 399/380; 399/365; 399/377; 399/379; 355/76

(58) Field of Classification Search ............ 399/380, 399/379, 362, 363, 364, 365, 377; 358/474, 358/497; 355/75, 76
See application file for complete search history.

(56) References Cited

U.S. PATENT DOCUMENTS

| | | | | | |
|---|---|---|---|---|---|
| 1,808,836 | A | * | 6/1931 | Caps ....................... | 355/76 |
| 5,338,018 | A | * | 8/1994 | Nagao et al. ............... | 271/3.05 |
| 6,351,624 | B1 | * | 2/2002 | Hiruta .................... | 399/380 |
| 6,405,017 | B1 | * | 6/2002 | Takahashi et al. ........... | 399/380 |
| 6,408,162 | B1 | | 6/2002 | Sheng | |
| 6,628,431 | B1 | * | 9/2003 | Masuda et al. .............. | 358/474 |
| 6,697,600 | B2 | * | 2/2004 | Nishikino et al. ........... | 399/380 |
| 6,882,822 | B2 | * | 4/2005 | Gomi et al. ................ | 399/380 |
| 2002/0141799 | A1 | * | 10/2002 | Hayashi .................... | 399/379 |

FOREIGN PATENT DOCUMENTS

| | | |
|---|---|---|
| EP | 1260876 A1 | 11/2002 |
| JP | 59-140460 | 8/1984 |
| JP | 3-144433 | 6/1991 |
| JP | 04062536 A * | 2/1992 |
| JP | 2003075941 A * | 3/2003 |
| KR | 199-26165 | 6/1997 |
| KR | 1998-36466 | 9/1998 |
| KR | 1999-21383 | 6/1999 |

OTHER PUBLICATIONS

Korean Office Action dated Nov. 29, 2005 issued in KR 2004-0002085.
Korea Office Action dated Jul. 6, 2007 issued in KR 2004-2085.

* cited by examiner

*Primary Examiner*—Judy Nguyen
*Assistant Examiner*—Matthew G Marini
(74) *Attorney, Agent, or Firm*—Stanzione & Kim LLP (57) ABSTRACT

An image reading apparatus having an improved cover device. The image reading apparatus includes a main body having an upper surface on which a manuscript can be placed, a cover installed at an upper portion of the main body to cover the manuscript when scanning, and a pressing plate movably installed in the direction perpendicular to an upper surface of the cover at an inner portion of the cover so as to press the manuscript. In addition, an elastic member is additionally inserted between the pressing plate and the cover.

27 Claims, 9 Drawing Sheets

IMAGE READING APPARATUS HAVING IMPROVED COVER DEVICE

CROSS-REFERENCE TO RELATED APPLICATIONS

This application claims the benefit of Korean Patent Application No. 2004-2085, filed 12 Jan., 2004, the disclosure of which is hereby incorporated herein by reference in its entirety.

BACKGROUND OF THE INVENTION

1. Field of the Invention

The present invention relates to a cover device of an image reading apparatus, and more particularly, to an image reading apparatus having an improved cover device provided with a structure to press a book or a manuscript while scanning.

2. Description of the Related Art

An image reading apparatus usually includes a duplicator as a multi-functional apparatus having functions of a copier and a facsimile, and an image scanner provided with an automatic manuscript feeder.

Figure 1:
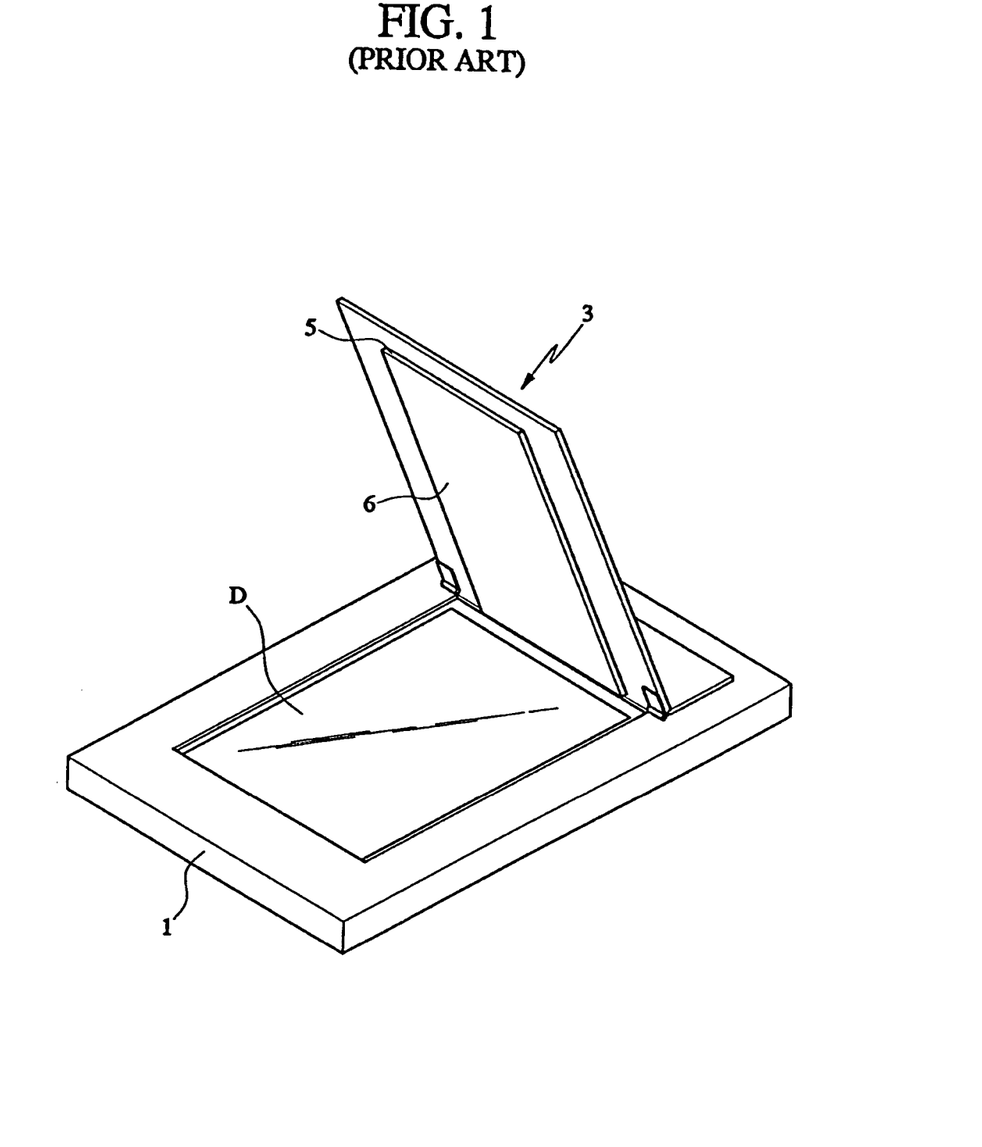
FIG. 1 is a view schematically illustrating a prior art image reading apparatus.

The image reading apparatus is, as shown in FIG. 1, provided with a main body 1, at which the image scanner and various components are installed, a transparent window D installed at an upper surface of the main body 1 for transmitting light emitted from the scanner, and a cover 3 installed at an upper portion of the main body 1, for covering a book or a manuscript when the scanner is operated. The cover 3 is provided with an elastic member 5 at its inner surface and a white sheet 6 for preventing the light emitted from the scanner from leaking to the outside.

The cover provided with the white sheet is disclosed in Korean Utility Model Laid-open Publication No. 1998-036466 (Publication Date: 1998, Sep. 15, Title: Cover device of a flat bed reading apparatus) and Korean Utility Model Laid-open Publication No. 1999-0021383 (Publication Date: 1999, Jun. 25, Title: Cover device of a manuscript reading apparatus).

However, the prior art white sheet adheres to the inner surface of the cover with the medium of the elastic member by using a special double-sided adhesive tape, thereby increasing the cost of materials and making the reuse of the white sheet impossible because of a breakdown of the elastic member when it is disassembled.

In addition, since the elastic member is so expensive, there is a problem of increasing the cost of materials.

SUMMARY OF THE INVENTION

It is, therefore, an aspect of the present general inventive concept to provide a cover device of an image reading apparatus capable of simplifying assembly and disassembly processes by improving a structure of a manuscript presser to press a manuscript to shield light.

It is another aspect of the present general inventive concept to provide a cover device of an image reading apparatus capable of enabling its reuse by improving a structure of a manuscript presser, and decreasing the manufacturing cost.

Additional aspects and advantages of the present general inventive concept will be set forth in part in the description which follows and, in part, will be obvious from the description, or may be learned by practice of the general inventive concept.

The foregoing and/or other aspects of the present general inventive concept are achieved by providing an image reading apparatus having an improved cover device including a main body having an upper surface on which a manuscript is placed, a cover installed at an upper portion of the main body to cover the manuscript on scanning, and a pressing plate movably installed in a direction perpendicular to an upper surface of the cover at an inner portion of the cover so as to press the manuscript.

In an aspect of the general inventive concept, the pressing plate further includes a fitting protrusion formed at its one end to be fitted into at least one fitted groove member formed at an inner surface of the cover, and a hooking protrusion formed at the other side of the pressing plate, at which the fitting protrusion is formed, to be hooked by at least one hooking projection member formed at the other side of the cover.

In another aspect of the general inventive concept, the pressing plate can be formed in a rectangular box shape, whose one surface is opened to the inner surface of the cover; the inner surface of the cover being further provided with an aligning rib whose end portions are in contact with four side surfaces of the rectangular box, respectively, to align a position of the pressing plate, the pressing plate being made of rigid plastic, and the pressing plate being made in a white color.

In another aspect of the general inventive concept, a first contact surface of the fitting groove member in contact with the fitting protrusion and a second contact surface of the hooking projection member in contact with the hooking protrusion can be located on the same line, a distance between the first and second contact surfaces and the inner surface of the cover can be maintained such that the fitting protrusion and the hooking protrusion are movable. The fitting protrusion can be made of a linearly protruding piece, the fitting groove member being perpendicular to the upper surface of the cover, and one side of the fitting groove member facing the inner surface of the cover can be formed in an open shape.

In yet another aspect of the general inventive concept, the hooking protrusion can have one sloped surface of a predetermined angle at its bottom surface and a horizontal surface at the other surface, the hooking projection member being perpendicular to the inner surface of the cover and one side of the hooking projection member facing the inner portion of the cover being formed in an open shape, the upper surface of the hooking projection member being downwardly sloping in the direction of the opened side at a predetermined angle, and both sides of the pressing plate, at which the hooking protrusion is formed, can be provided with a slit hole to provide movability when the hooking protrusion is inserted and/or separated between and/or from the hooking projection member and the cover.

In still another aspect of the general inventive concept, the elastic member can be additionally inserted between the pressing plate and the cover, adopting at least one among a coil spring, a sponge member and a plate spring, and can be installed at four corners of the pressing plate.

In still another aspect of the general inventive concept, the elastic member (the coil spring or the sponge member) can be engaged with an elastic member mounting portion formed in the inner surface of the pressing plate and a stem protruding from the inner surface of the cover, and the stem can be formed in a crossed bar shape.

In still another aspect of the general inventive concept, the aligning rib can have a #-shape, whose one end is in contact with the four side surfaces of the pressing plate and can be further provided with a pressing plate mounting rib so that the mounting surface of the pressing plate can be located on the same horizontal surface with the inner portion of the cover facing upward against the ground.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

The present general inventive concept will now be described more fully hereinafter with reference to the accompanying drawings, in which various embodiments of the general inventive concept are shown. This invention may, however, be embodied in different forms and should not be construed as limited to the embodiments set forth herein. Rather, these embodiments are provided so that this disclosure will be thorough and complete, and will fully convey the scope of the general inventive concept to those skilled in the art. In the drawings, the thickness of layers and regions are exaggerated for clarity. Like numbers refer to like elements throughout the specification.

Figure 2:
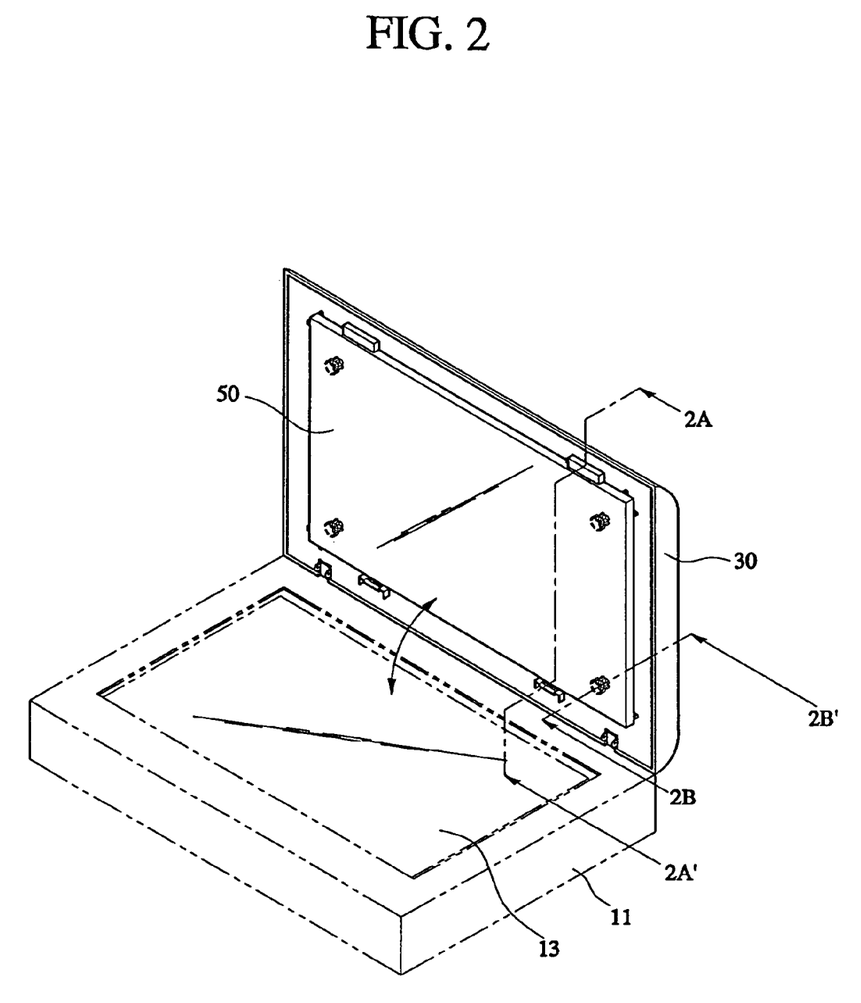
FIG. 2 is a schematic view of an image reading apparatus in accordance with an embodiment of the present invention.

As shown in FIG. 2, a main body 11 is provided with a scanner and various components installed therein, a transparent window 13 to transmit light emitted from the scanner at an upper surface thereof, and a cover 30 to cover a book or a manuscript on scanning at an upper portion thereof.

A pressing plate 50 to press the manuscript placed on an upper side of the transparent window 13 can be installed at an inner portion of the cover 30 to be movable in a direction perpendicular to an inner surface of the cover 30. Therefore, the pressing plate 50 moves downward by its weight to press an upper surface of a manuscript (or other document) with the cover 30 covering an upper surface of the main body 11.

Here, the pressing plate 50 is made to have a white color to serve as a white sheet, and can be injection molded with a rigid plastic material.

Hereinafter, an engaging relationship of the pressing plate 50 and the cover 30 will be described.

Figure 3:
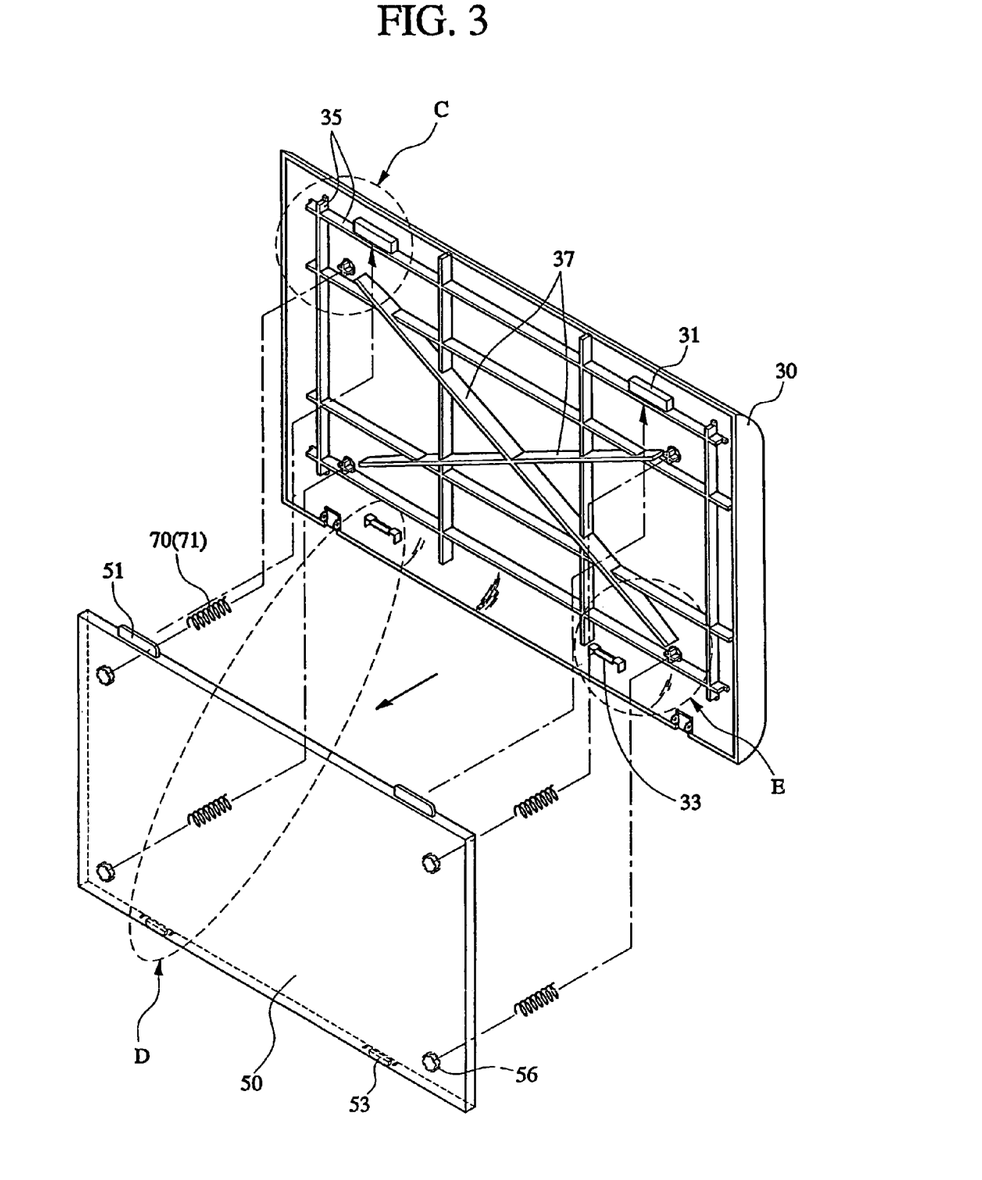
FIG. 3 is a disassembled perspective view illustrating a state in which the pressing plate and the image reading apparatus of FIG. 2 are separated from each other.
Figure 4:
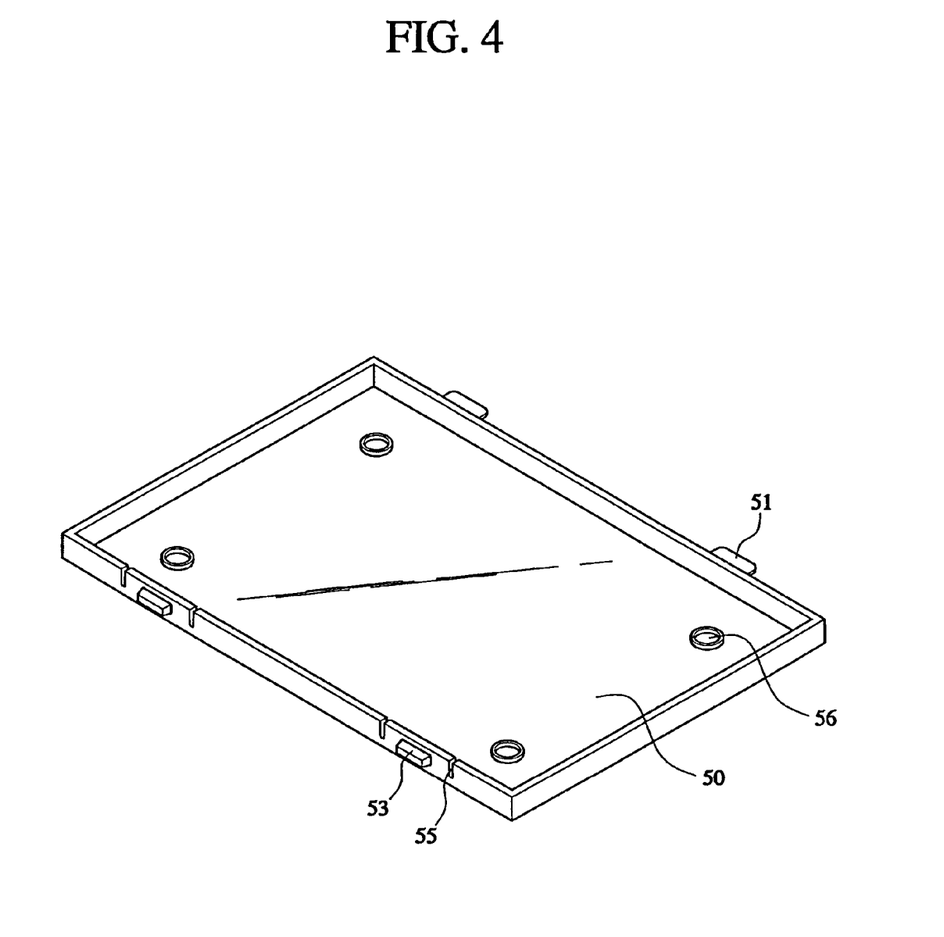
FIG. 4 is a perspective view illustrating an inner side of the pressing plate of FIGS. 2 and 3.
Figure 5:
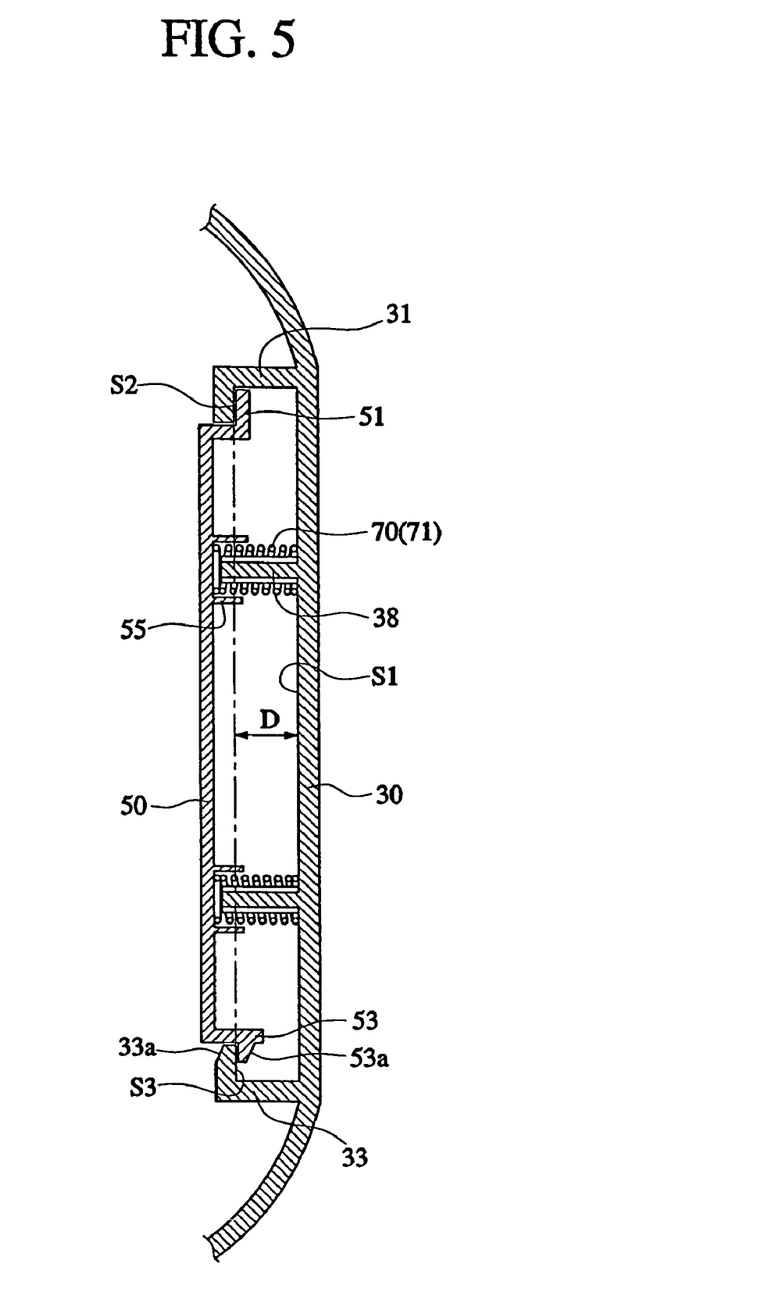
FIG. 5 is a cross-sectional view of the cover and pressing plate of FIGS. 2 and 3 taken along line 2A-2' of FIG. 2.

First, the pressing plate 50, as shown in FIGS. 3 to 5, can be formed in a rectangular box shape, whose one surface is opened to the inner surface of the cover 30, can have at least one fitting protrusion 51 formed at one side thereof, and can have at least one hooking protrusion 53 formed at the other side thereof. Additionally, a fitting groove member 31 to engage with the fitting protrusion 51 can be formed at one side of the inner portion of the cover 30, and a hooking projection member 33, at which the hooking protrusion 53 can be hooked in a snap manner, can be formed at the other side of the inner portion of the cover 30.

Figure 6:
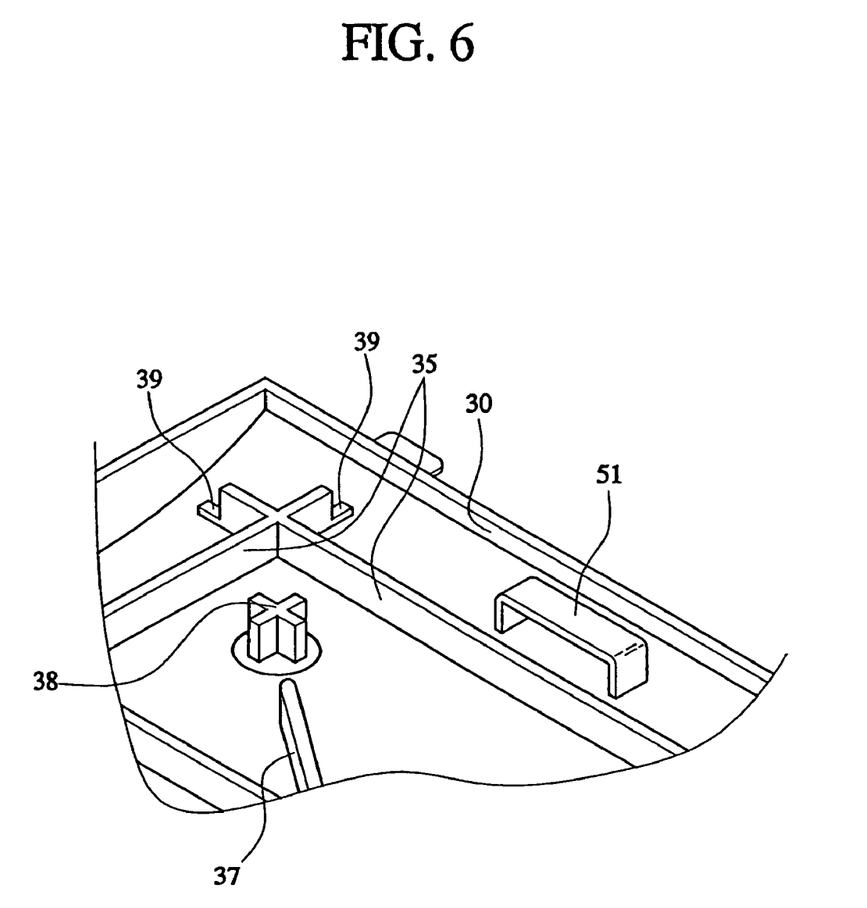
FIG. 6 is an enlarged view of a portion C of FIG. 3.
Figure 7:
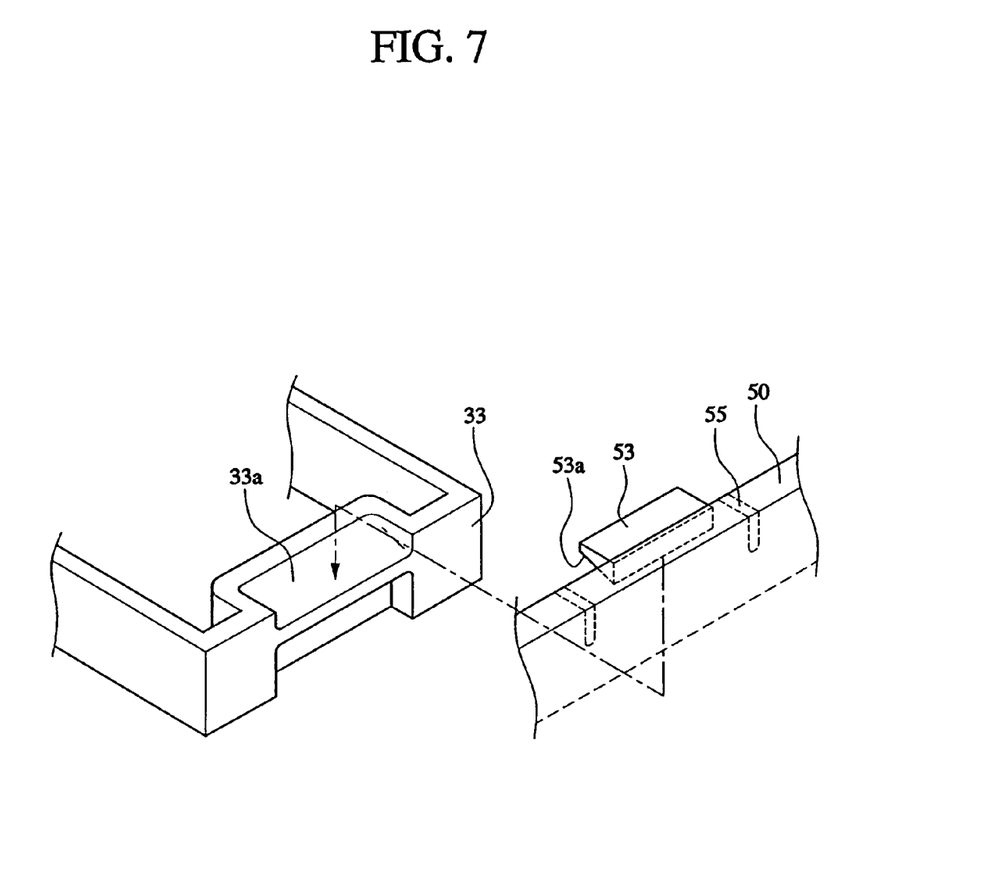
FIG. 7 is an enlarged view of a portion D of FIG. 3.

As shown in FIGS. 3 to 5, the fitting protrusion 51 can be formed of a linearly protruding piece from a side surface of the pressing plate 50, and the fitting groove member 31, whose one side can be open to face the inner side of the cover 30, as shown in FIGS. 5 and 6, can be perpendicular to an inner surface S1 of the cover 30 to insert the fitting protrusion 51.

The hooking protrusion 53, as shown in FIGS. 3, 4, 5 and 7, can be formed at the other side of the pressing plate 50 provided with the fitting protrusion 51. One side of the hooking protrusion 53 facing the inner portion of the cover 30 can have a sloped surface 53a with a predetermined angle, and the other side of the hooking protrusion 53 can have a surface parallel with the surface of the pressing plate 50. Further, the hooking projection member 33 can be perpendicular to the inner surface of the cover 30, one side of the hooking projection member 33 can be open to face the inner surface of the cover 30, and another side of the hooking projection member 33 opposite to the side facing the cover 30 can have a sloped surface 33a, sloping to be inclined in the direction of the opened side with a predetermined angle. Both sides of the pressing plate 50, at which the hooking protrusion 53 is formed, can be provided with a slit hole 55 to provide movability when the hooking protrusion 53 is inserted between and separated from the hooking projection member 53 and the cover 30.

In accordance with the above-mentioned description, first, when the hooking protrusion 53 formed at the other side of the pressing plate 50 is pressed after the fitting protrusion 51 is inserted into the fitting groove member 31, the hooking protrusion 53 can be slid past the hooking projection member 33 to be hooked by the hooking projection member 33. At this time, the sloped surface 53a of the hooking protrusion 53 can be easily slid along the sloped surface 33a of the hooking projection member 33 and movable due to the slit hole 55, thereby facilitating insertion of the pressing plate 50. Similarly, a separation of the hooking protrusion 53 from the hooking projection member 33 can be also easily accomplished.

In accordance with the following description, the pressing plate 50 can be moved in the direction perpendicular to the inner surface of the cover 30.

As shown in FIG. 5, a first contact surface S2 of the fitting groove member 31 in contact with the fitting protrusion 51, and a second contact surface S3 of the hooking projection member 33 in contact with the hooking protrusion 53 can be located on the same line, and a distance D between the line of the first and second contact surfaces S2 and S3 and the inner surface S1 of the cover 30 can be maintained such that the fitting protrusion 51 and the hooking protrusion 53 are movable.

Figure 8:
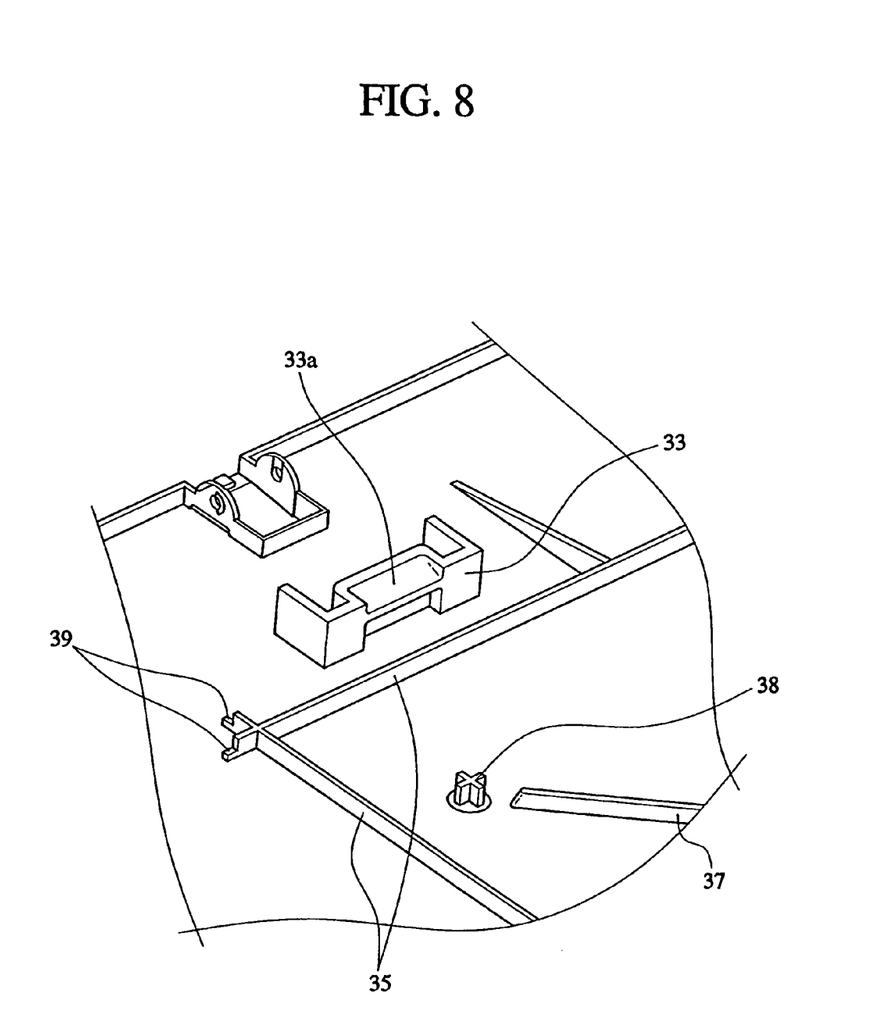
FIG. 8 is an enlarged view of a portion E of FIG. 3.

In addition, as shown in FIGS. 3 and 8, the cover 30 can be additionally provided with a #-shaped (or grid shaped) aligning rib 35 at its inner surface S1. The aligning rib 35 can be formed to contact the inner four corners of the pressing plate 50 provided with an end portion having a rectangular box shape.

As described hereinabove, the aligning rib 35 is not limited to the #-shape, and all rib shapes that are formed at each corner of the pressing plate 50 to be in contact with the 4 side surfaces of the pressing plate 50 are possible. However, the #-shaped rib has an effect of preventing the cover 30 from bending by reinforcing the cover 30. In order to reinforce the pressing plate 50, a separate reinforcement rib 37 can be additionally formed.

Additionally, as shown in FIG. 8, each end of the aligning rib 35 can be further provided with a pressing plate mounting rib 39 so that the mounting surface of the pressing plate 50 is located on the same horizontal surface with the inner portion of the cover 30 and facing upward away from the ground when the cover 30 is closed with respect to the main body 11. The reason for this is to ensure that the pressing plate 50 is mounted on the same horizontal surface as the cover 30 even though the cover 30 may be designed to have a curved surface.

In accordance with the above-mentioned description, the pressing plate 50 can move downward by its weight to press the manuscript with the cover 30 covering the main body 11. In this case, the pressing plate 50 is moved in the direction perpendicular to the inner surface of the cover 30 and remains in a predetermined position parallel to the inner surface of the cover 30 by the aligning rib 35.

An elastic member 70 can be inserted between the pressing plate 50 and the cover 30 in order to prevent the cover 30 from becoming deformed when the pressing plate 50, which is made of rigid materials, presses a manuscript or other type of document, and to provide for a uniform force to be applied to a manuscript (or another type of document).

Hereinafter, the elastic member 70 will be apparent from the following description with reference to FIGS. 3, 5 and 9.

Figure 9:
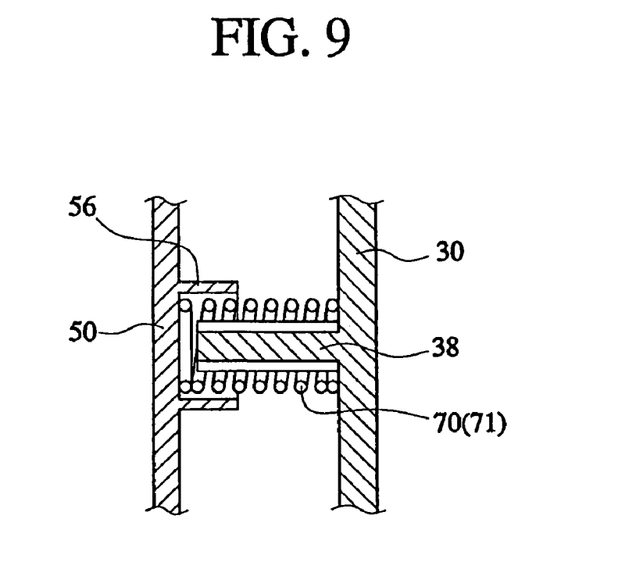
FIG. 9 is a cross-sectional view of an elastic member taken along line 2B-2B' of FIG. 2.

As shown in FIGS. 3, 5 and 9, a coil spring 71 can be employed as the elastic member 70, a stem 38 to fix the coil spring 71 can protrude at the inner surface of the cover 30, and an elastic member mounting portion 56 can protrude at the inner surface of the pressing plate 50 facing the stem 38. In this case, the stem 38 can be formed in a crossed bar shape. In accordance with the above-mentioned embodiment, the coil spring 71 can be inserted around the stem 38 to be in contact with the inner surface of the cover at its one end, and inserted into the inner portion of the elastic member mounting portion 56 to be in contact with the inner surface of the pressing plate 50 towards the pressing plate 50.

Figure 10:
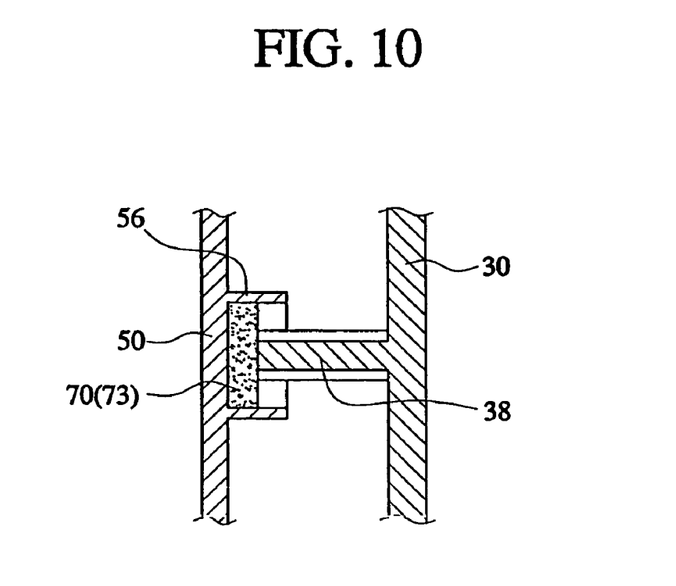
FIG. 10 is a view illustrating another embodiment of the elastic member of FIG. 9.

FIG. 10 is a view illustrating a sponge member 73 employed as the elastic member 70.

The sponge member 73 can also be fixed by the same fixing structure as the coil spring 71, i.e., the sponge member 73 can be inserted into the inner portion of the elastic member mounting portion 56 formed at the inner surface of the pressing plate 50 to be fixedly in contact with the inner surface of the pressing plate at its one surface, and fixedly in contact with the upper end of the stem 38 protruding at the inner surface of the cover 30 at the other surface.

The elastic member is not limited to the coil spring 71 and the sponge member 73, but instead can be of various types of elastic members such as, for example, a plate spring, and can be installed at four corners of the pressing plate 50.

As described hereinabove, the present general inventive concept has advantages of reducing the cost of materials and enabling the recycling by manufacturing the pressing plate with rigid materials to be moved in the direction perpendicular to the inner surface of the cover, and making it possible to attach and detach to and from the cover.

In addition, the present general inventive concept has an advantage of uniformly pressing the manuscript by an elastic force of the elastic member, though the cover may be deformed, by inserting an elastic member between the pressing plate and the cover.

Although a few embodiments of the present general inventive concept have been shown and described, it will be appreciated by those skilled in the art that changes may be made in these embodiments without departing from the principles and spirit of the invention, the scope of which is defined in the appended claims and their equivalents.

What is claimed is:

1. An image reading apparatus, comprising:
   a main body having an upper surface on which a manuscript is placed;
   a cover installed at an upper portion of the main body to cover the manuscript when scanning and having a fitting groove member formed at one end of an inner surface of the cover and a hooking projection member formed at an opposite end of the inner surface of the cover; and
   a pressing plate movably installed at the fitting groove member and the hooking projection member such that the whole pressing plate is movable in a direction perpendicular to an upper surface of the manuscript and enclosed within a perimeter of a curved surface of an inner portion of the cover to press the manuscript and to reflect back a light emitted from the main body during scanning,
   wherein the pressing plate comprises a fitting protrusion formed at one end thereof to be fitted into the fitting groove member formed at one end of the inner surface of the cover, and a hooking protrusion formed at the other end thereof with respect to the end where the fitting protrusion is formed, the hooking protrusion to be hooked by the hooking projection member formed at the opposite end of the inner surface of the cover,
   wherein the hooking protrusion and the hooking projection member are hooked in a snapping manner.

2. The image reading apparatus according to claim 1, wherein a first contact surface of the fitting groove member to be in contact with the fitting protrusion and a second contact surface of the hooking projection member to be in contact with the hooking protrusion are located along a same line, and a distance between the line of the first and second contact surfaces and the inner surface of the cover is maintained such that the fitting protrusion and the hooking protrusion are movable therebetween.

3. The image reading apparatus according to claim 2, wherein the fitting protrusion is made of a linearly protruding piece at the side surface of the pressing plate, the fitting groove member is perpendicular to the upper surface of the cover, and one side of the fitting groove member faces the inner surface of the cover and is formed in an open shape.

4. The image reading apparatus according to claim 2, wherein the hooking protrusion has one sloped surface facing the inner portion of the cover with a predetermined angle at its bottom surface and a horizontal surface at the other surface, the hooking projection member is perpendicular to the inner surface of the cover, one side of the hooking projection member faces the inner portion of the cover and is formed in an open shape, and an upper surface of the hooking projection member is downwardly sloped in a direction of the opened side with a predetermined angle.

5. The image reading apparatus according to claim 4, wherein both sides of the pressing plate, at which the hooking protrusion is formed are provided with a slit hole to provide movability when the hooking protrusion contacts and moves away from the hooking protection member.

6. The image reading apparatus according to claim 1, wherein the pressing plate and the cover further have an elastic member therebetween.

7. The image reading apparatus according to claim 6, wherein the elastic member employs at least one among a coil spring, a sponge member and a plate spring.

8. The image reading apparatus according to claim 7, wherein the coil spring is inserted into an inner portion of an elastic member mounting portion formed at an inner surface of the pressing plate at one end, and inserted around a stem protruding at an inner surface of the cover to be in contact with the inner surface of the cover at another end thereof.

9. The image reading apparatus according to claim 8, wherein the stem has a crossed bar shape.

10. The image reading apparatus according to claim 7, wherein the sponge member is inserted into an inner portion of an elastic member mounting portion formed at an inner surface of the pressing plate to be fixedly in contact with the inner surface of the pressing plate at one surface, and fixedly in contact with an upper end of a stem protruding at the inner surface of the cover at another surface thereof.

11. The image reading apparatus according to claim 10, wherein the stem has a crossed bar shape.

12. The image reading apparatus according to claim 7, wherein the elastic member is installed at four corners of the pressing plate.

13. The image reading apparatus according to claim 1, wherein the pressing plate is formed in a rectangular box shape such that one surface is opened to the inner surface of the cover; and the inner surface of the cover is provided with an aligning rib such that end portions are in contact with four side surfaces of the rectangular box, respectively, to align a position of the pressing plate.

14. The image reading apparatus according to claim 13, wherein the aligning rib has a grid shape.

15. The image reading apparatus according to claim 13, wherein one end of the aligning rib contacted with the four side surfaces of the pressing plate is further provided with a pressing plate mounting rib so that the mounting surface of the pressing plate is located on the same horizontal surface with the inner portion of the cover facing upward against the ground.

16. The image reading apparatus according to claim 1, wherein the pressing plate is made of a rigid material.

17. The image reading apparatus according to claim 16, wherein the rigid material is plastic.

18. The image reading apparatus according to claim 1, wherein the pressing plate is made in white.

19. An image reading apparatus comprising:
a main body;
a cover movable away from and towards a top portion of the main body at which image reading is performed; and
a pressing plate to reflect back light emitted from the main body during a scanning operation and enclosed within a perimeter of a curved surface of and elastically connected to a side of an inner opening of the cover facing the top portion of the main body such that the pressing plate moves in a direction towards the cover when pressed against a document to be read and away from the cover when the cover and pressing plate are moved away from the document to be read,
wherein the cover comprises a fitting groove member formed at one end of an inner surface of the cover and a hooking projection member formed at an opposite end of the inner surface of the cover,
wherein the pressing plate comprises a fitting protrusion formed at one end thereof to be fitted into the fitting groove member formed at one end of the inner surface of the cover, and a hooking protrusion formed at the other end thereof with respect to the end where the fitting protrusion is formed, the hooking protrusion to be hooked by the hooking projection member formed at the opposite end of the inner surface of the cover, and
wherein the hooking protrusion and the hooking projection member are hooked in a snapping manner.

20. The image reading apparatus according to claim 19, wherein different portions of the pressing plate which are pressed against the document are capable of moving independently of one another.

21. The image reading apparatus according to claim 20, wherein a first area of the different portions of the pressing plate is capable of moving towards the cover and a second area of the different portions of the pressing plate is capable of remaining substantially stationary when the pressing plate presses against the document.

22. An image reading apparatus comprising:
a main body having a surface capable of receiving a document;
a cover capable of being disposed in an opposing relation to the surface of the main body;
a pressing plate enclosed within a perimeter of an inner opening of the cover; and
an elastic unit disposed between the pressing plate and the cover to continuously bias the pressing plate away from the cover and towards the surface of the main body,
wherein the cover comprises a fitting groove member formed at one end of an inner surface of the cover and a hooking projection member formed at an opposite end of the inner surface of the cover,
wherein the pressing plate comprises a fitting protrusion formed at one end thereof to be fitted into the fitting groove member formed at one end of the inner surface of the cover, and a hooking protrusion formed at the other end thereof with respect to the end where the fitting protrusion is formed, the hooking protrusion to be hooked by the hooking projection member formed at the opposite end of the inner surface of the cover, and
wherein the hooking protrusion and the hooking projection member are hooked in a snapping manner.

23. The image reading apparatus according to claim 22, wherein the elastic unit is a plurality of sponges.

24. The image reading apparatus according to claim 22, wherein the elastic unit is a plurality of springs.

25. The image reading apparatus according to claim 22, wherein the elastic unit comprises a plurality of elastic elements.

26. The image reading apparatus according to claim 25, wherein the elastic elements are in a cooperative relation with a movement of the pressing plate.

27. The image reading apparatus according to claim 22, wherein the elastic unit supports the pressing plate when the cover is placed in the opposing relation to the document.

* * * * *